US012580822B2

(12) United States Patent
Malakhovskyi et al.

(10) Patent No.: US 12,580,822 B2
(45) Date of Patent: Mar. 17, 2026

(54) GATEWAY HEALTH MONITORING SYSTEM

(71) Applicant: Kyndryl, Inc., New York, NY (US)

(72) Inventors: Oleksandr Malakhovskyi, Berlin (DE);
Kim Poh Wong, Singapore (SG);
Ravinder Akula, Bengaluru (IN);
Jeevabharathy Murugesan, Bangalore
(IN); Clea Zolotow, Dublin (IE)

(73) Assignee: Kyndryl, Inc., New York, NY (US)

( * ) Notice: Subject to any disclaimer, the term of this
patent is extended or adjusted under 35
U.S.C. 154(b) by 91 days.

(21) Appl. No.: 18/657,839

(22) Filed: May 8, 2024

(65) Prior Publication Data

US 2025/0350536 A1 Nov. 13, 2025

(51) Int. Cl.
H04L 41/14 (2022.01)
H04L 41/147 (2022.01)

(52) U.S. Cl.
CPC .......... H04L 41/145 (2013.01); H04L 41/147
(2013.01)

(58) Field of Classification Search
None
See application file for complete search history.

(56) References Cited

U.S. PATENT DOCUMENTS

| RE48,507 E | 4/2021 | Palladino et al. |
| 11,194,809 B2 | 12/2021 | Buda et al. |

| 11,868,629 B1 * | 1/2024 | Singh .................... G06F 3/0632 |
| 2015/0188927 A1 | 7/2015 | Santhi et al. |
| 2015/0341240 A1 | 11/2015 | Iyoob et al. |
| 2016/0357611 A1 | 12/2016 | Sapuram et al. |
| 2019/0158929 A1 | 5/2019 | Sreedhara, Sr. |
| 2021/0028991 A1 * | 1/2021 | Nataraj .................. H04L 41/16 |
| 2021/0067836 A1 | 3/2021 | Hornsby et al. |
| 2021/0385124 A1 | 12/2021 | Roy et al. |
| 2022/0188336 A1 * | 6/2022 | Sen ...................... G06F 16/2282 |
| 2025/0165300 A1 * | 5/2025 | Se .......................... G06F 9/5055 |

OTHER PUBLICATIONS

Anonymous, "Big O Notation in Data Structures," URL: https://
www.javatpoint.com/big-O-notation-in-data-structure, Retrieved: Feb.
20, 2024, 9 pages.

(Continued)

*Primary Examiner* — Fadi Haj Said
(74) *Attorney, Agent, or Firm* — CANTOR COLBURN
LLP; Erik Swanson

(57) ABSTRACT

Computer-implemented methods for a gateway health moni-
toring system. Aspects include generating a mapping
between entity utilization metrics and an application of a
mainframe of a hybrid cloud system. Aspects also include
determining a correlation between the entity utilization
metrics and information technology (IT) performance met-
rics. Aspects further include defining a relationship between
an entity utilization driver and the IT performance metrics
using the mapping and the correlation. Aspects also include
generating forecasted values using the relationship between
the entity utilization driver and the IT performance metrics.
Aspects further include generating a proposed infrastructure
configuration based on the forecasted values.

23 Claims, 7 Drawing Sheets

(56) References Cited

OTHER PUBLICATIONS

Anonymous, "Configuring CICS for Intersystem Communication," URL: https://www.microfocus.com/documentation/MainframeExpress/mx31/cscomm.htm, Retrieved: Feb. 20, 2024, 10 pages.

Bellairs, "What is Parallel Programming and Multithreading?" URL: https://www.perforce.com/blog/qac/multithreading-parallel-programming-c-cpp, Published: Apr. 10, 2019, Retrieved: Feb. 20, 2024, 7 pages.

Craggs, "Mainframe API tools: Competitive Assessment" URL: https://www.adaptigent.com/wp-content/uploads/2020/06/Mainframe_API_Tools_Assessment.pdf, Feb. 2019, Retrieved: Feb. 20, 2024, 27 pages.

Sari, "Concurrency vs Parallelism," URL: https://www.baeldung.com/cs/concurrency-vs-parallelism, Updated: Jun. 8, 2023, Retrieved: Feb. 20, 2024, 7 pages.

* cited by examiner

REPORTING AND ANALYSIS FRAMEWORK
400

PRESENTATION
402

ANALYSIS
404

INTEGRATION
406

EXTRACT, TRANSFORM, & LOAD
408

DATA SOURCES
410

GATEWAY HEALTH MONITORING SYSTEM

BACKGROUND

The present invention generally relates to mainframe computers, and more specifically, to computer-implemented methods, computer systems, and computer program products configured and arranged for a gateway health monitoring system.

Mainframes are high-performance computers capable of handling large-scale transaction processing and are known for their reliability, availability, and serviceability. Mainframes act as servers for storing and processing data at high speeds and can carry out millions of instructions simultaneously. However, the assets of mainframes can be difficult to access by external systems without compromising the characteristics of the mainframe that make them valuable. Additionally, utilization of mainframes is associated with a cost. For example, some mainframes use million service units (MSU) for software pricing charges. An MSU is a measurement of the amount of processing work that a computer can perform in an hour.

The modernization of mainframes to evolve with emerging new technologies needs to safeguard the level of security, compliance, and availability provided by mainframes while also leveraging technological advancements. An additional benefit of the modernization of mainframes is the possible cost savings associated with offloading some of the workload of a mainframe to other components that are not factored into the cost of mainframe utilization.

One example of an approach for exposing mainframe applications to external systems is screen scraping. Screen scraping is the process of using a terminal emulator to access data on the mainframe. This process does not require any modifications to mainframe applications and the mainframe is unaware that the mainframe application is externally driven. However, screen scraping can negatively impact the performance of the mainframe and lacks scalability.

Another approach for exposing mainframe applications to external systems is using an enterprise service bus (ESB). An ESB is an architecture that implements a communication system between different systems and applications over a bus-like infrastructure over which the different systems can communicate through the bus-like infrastructure using messages. Although this approach is scalable, it does require mainframe applications to be altered to enable-messaging. Such alterations to the mainframe applications can expose the mainframe to vulnerabilities and threaten their security.

A programmatic access approach to exposing mainframe applications to external systems involves using programmatic interfaces that are already utilized by mainframes to support external call or link access. A framework is built to leverage the existing programmatic interfaces and a mapping of data fields between the systems is provided. Thus, mainframes applications do not need to be modified for this approach. However, this approach may also suffer from scalability and performance issues. Additionally, utilizing a programmatic access approach may require extensive mainframe experience and knowledge.

Another approach to modernizing mainframes is to incorporate mainframes into hybrid clouds using an Application Programming Interface (API) architecture to provide external systems access to the mainframe assets. The API model enables the aggregation of different external systems and mainframes with minimal effort and without the need for specialized skills. The mainframe assets are made available externally through APIs, which can then be utilized by the external systems.

Unfortunately, current approaches are not able to handle the integrated response time components for hyperscaler integration with the mainframe utilized for conversion of workloads from general purpose processors to specialty processors. In particular, determining which connectivity features between the mainframe and external systems provide the best response time with the least impact to the performance of the mainframe and external systems is difficult because of the workload conversion from a general-purpose processor.

SUMMARY

Embodiments of the present invention are directed to computer-implemented methods for a gateway health monitoring system. A non-limiting computer-implemented method includes generating a mapping between entity utilization metrics and an application of a mainframe of a hybrid cloud system. The method also includes determining a correlation between the entity utilization metrics and information technology (IT) performance metrics. The method further includes defining a relationship between an entity utilization driver and the IT performance metrics using the mapping and the correlation. The method also includes generating forecasted values using the relationship between the entity utilization driver and the IT performance metrics. The method further includes generating a proposed infrastructure configuration based on the forecasted values. This can provide an improvement over known computer monitoring systems by utilizing performance metrics of the different components of the hybrid cloud system to generate an integrated response time for integrating the mainframe with the hybrid cloud and analyzing the impact of the conversion of workloads from general-purpose processors to specialty processors.

In addition to one or more features described above or below, or as an alternative, one or more embodiments of the present invention disclose that the method further includes validating the relationship between the entity utilization driver and the IT performance metrics using values calculated using big O functions. Thus, advantageously providing an improvement to ensure that an identified relationship between an entity business driver and the IT performance metrics is accurate based on current and predicted execution times and that the forecasted values used to generate the proposed infrastructure configuration are based on the correct identified relationship.

In addition to one or more features described above or below, or as an alternative, one or more embodiments of the present invention disclose that defining the relationship between the entity utilization driver and the IT performance metrics using the mapping and the correlation further includes using a regression curve to define the relationship between the entity utilization driver and the IT performance metrics. Thus, advantageously providing an improvement to accurately identify correlations between entity utilization metrics and IT performance metrics to identified optimized infrastructure configurations for migrating the mainframe to the hybrid cloud system.

In addition to one or more features described above or below, or as an alternative, one or more embodiments of the present invention disclose that the method further includes receiving the IT performance metrics from different components of the hybrid cloud system. Thus, advantageously providing an improvement to obtain information from different components of the hybrid cloud system to use to accurately identify an optimized infrastructure configuration for the mainframe migration to a hybrid cloud system.

In addition to one or more features described above or below, or as an alternative, one or more embodiments of the present invention disclose that the method further includes identifying deviations of the forecasted values using a calculated correlation coefficient and a predetermined value. Thus, advantageously providing an improvement mechanism to ensure that the forecasted values are not influenced by outside variables and are based on the entity utilization metrics and IT performance metrics.

In addition to one or more features described above or below, or as an alternative, one or more embodiments of the present invention disclose that the method further includes receiving the entity utilization metrics from a file or access to a datastore of an entity. Thus, advantageously providing an improvement for ensuring the use of entity utilization metrics as well as IT performance metrics for generating a proposed infrastructure configuration.

In addition to one or more features described above or below, or as an alternative, one or more embodiments of the present invention disclose that the method further includes generating a report comprising the proposed infrastructure configuration and a list of additional hardware components, a list of additional software components, or proposed cost savings. Thus, advantageously providing an improvement to ensure that the report includes additional context and steps for the entity to facilitate migration of the mainframe into the hybrid cloud system.

According to another non-limiting embodiment of the invention, a system is provided. The system includes a memory having computer readable instructions and one or more processors for executing the computer readable instructions, the computer readable instructions controlling the one or more processors to perform operations. The operations include generating a mapping between entity utilization metrics and an application of a mainframe of a hybrid cloud system. The operations also include determining a correlation between the entity utilization metrics and information technology (IT) performance metrics. The operations further include defining a relationship between an entity utilization driver and the IT performance metrics using the mapping and the correlation. The operations also include generating forecasted values using the relationship between the entity utilization driver and the IT performance metrics. The operations further include generating a proposed infrastructure configuration based on the forecasted values. This can provide an improvement over known computer monitoring systems by utilizing performance metrics of the different components of the hybrid cloud system to generate an integrated response time for integrating the mainframe with the hybrid cloud and analyzing the impact of the conversion of workloads from general-purpose processors to specialty processors.

According to another non-limiting embodiment of the invention, a computer program product is provided. The computer program product includes a computer-readable storage medium having program instructions embodied therewith, the program instructions executable by a processor to cause the processor to perform operations. The operations include generating a mapping between entity utilization metrics and an application of a mainframe of a hybrid cloud system. The operations also include determining a correlation between the entity utilization metrics and information technology (IT) performance metrics. The operations further include defining a relationship between an entity utilization driver and the IT performance metrics using the mapping and the correlation. The operations also include generating forecasted values using the relationship between the entity utilization driver and the IT performance metrics. The operations further include generating a proposed infrastructure configuration based on the forecasted values. This can provide an improvement over known computer monitoring systems by utilizing performance metrics of the different components of the hybrid cloud system to generate an integrated response time for integrating the mainframe with the hybrid cloud and analyzing the impact of the conversion of workloads from general-purpose processors to specialty processors.

According to another non-limiting embodiment of the invention, a computer-implemented method includes receiving a request for a migration strategy for integration of a mainframe computer to a hybrid cloud system. The method further includes receiving performance metrics from different components of the hybrid cloud system. The method also includes receiving entity utilization metrics for an entity. The method includes generating forecasted values using the performance metrics and the entity utilization metrics. The method further includes generating a proposed infrastructure configuration based on the forecasted values. This can provide an improvement over known computer monitoring systems by utilizing performance metrics of the different components of the hybrid cloud system to generate an integrated response time for integrating the mainframe with the hybrid cloud and analyzing the impact of the conversion of workloads from general-purpose processors to specialty processors.

In addition to one or more features described above or below, or as an alternative, one or more embodiments of the present invention disclose that generating the forecasted values using the performance metrics and the entity utilization metrics further includes generating a mapping between the entity utilization metrics and an application of the mainframe computer. The method also includes determining a correlation between the entity utilization metrics and the performance metrics. The method includes defining a relationship between an entity utilization driver and the performance metrics using the mapping and the correlation. The method includes generating the forecasted values using the relationship between the entity utilization driver and the performance metrics. Thus, advantageously providing an improvement to identifying relationships that can be used to determine an optimized infrastructure configuration to integrate the mainframe into a hybrid cloud system.

According to another non-limiting embodiment of the invention, a system is provided. The system includes a memory having computer readable instructions and one or more processors for executing the computer readable instructions, the computer readable instructions controlling the one or more processors to perform operations. The operations include receiving a request for a migration strategy for integration of a mainframe computer to a hybrid cloud system. The operations further include receiving performance metrics from different components of the hybrid cloud system. The operations also include receiving entity utilization metrics for an entity. The operations include generating forecasted values using the performance metrics and the entity utilization metrics. The operations further include generating a proposed infrastructure configuration based on the forecasted values. This can provide an improvement over known computer monitoring systems by utilizing performance metrics of the different components of the hybrid cloud system to generate an integrated response time for integrating the mainframe with the hybrid cloud and analyzing the impact of the conversion of workloads from general-purpose processors to specialty processors.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
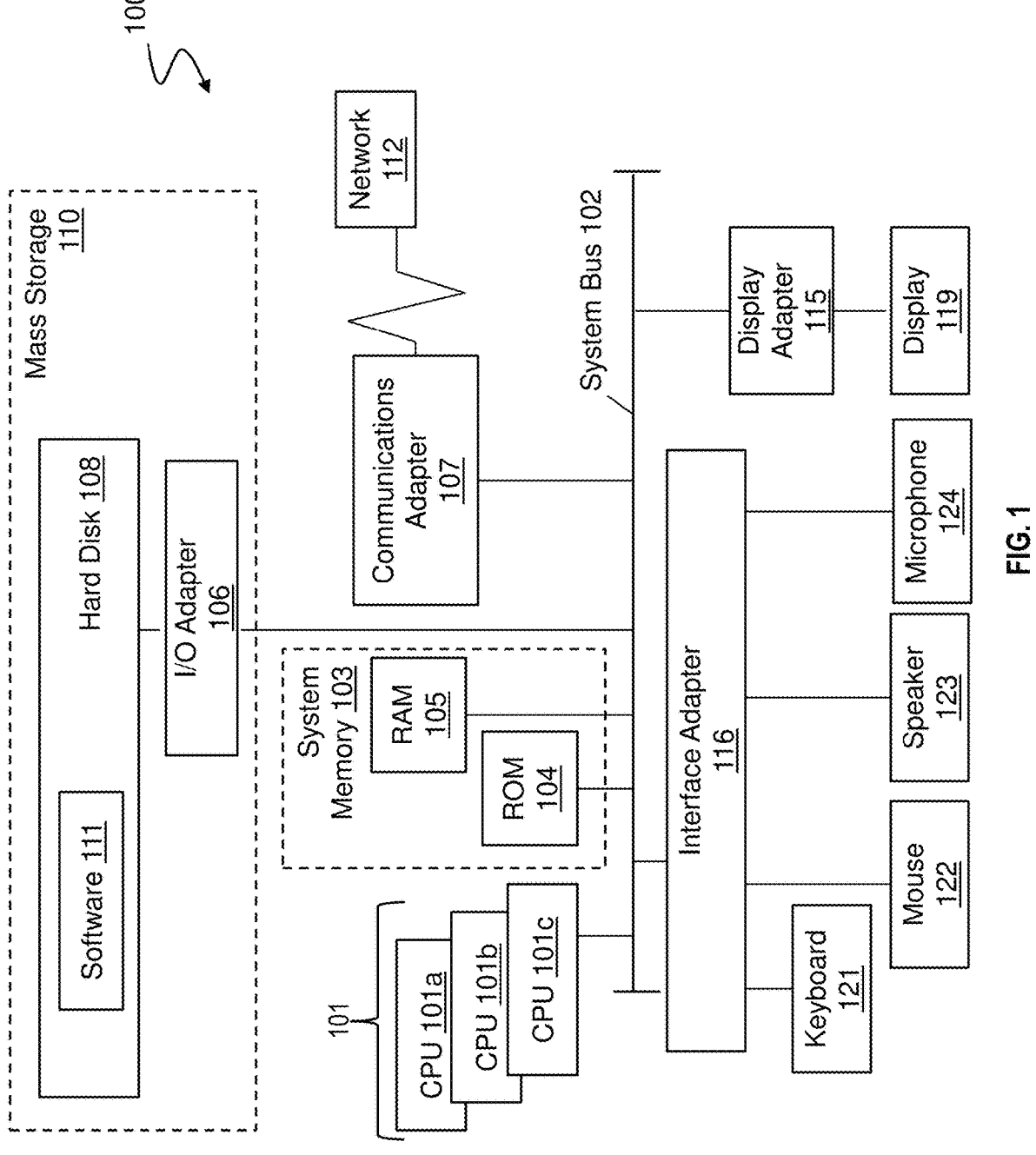
FIG. 1 depicts a block diagram of an example computer system for use in conjunction with one or more embodiments of the present invention.

Disclosed herein are methods, systems, and computer program products for a gateway health monitoring system. As discussed above, mainframes are high-performance computers capable of handling large-scale transaction processing and are known for their reliability, availability, and serviceability. To leverage newer technologies while maintaining the benefits of utilizing a mainframe, mainframes are integrated with other technologies in a hybrid cloud system. A hybrid cloud system combines and unifies on-premises, public clouds, private clouds, and edge computing to create a single infrastructure. Current approaches are not able to handle the integrated response time components for hyper-scaler integration with the mainframe utilized for conversion of workloads from general-purpose processors to specialty processors. Workload conversions from a general-purpose processors to specialty processors requires a different sizing methodology based on their different structures.

As technical solutions and benefits, the systems and methods described herein are directed to a gateway health monitoring system that evaluates various connectivity elements of the different components of a hybrid cloud system to determine an infrastructure configuration that provides an optimal transaction response time with the least impact to the system.

According to one or more embodiments, the systems and methods described herein ensure that migrating from traditional mainframe languages, such as PL/1, COBOL, Fortran, and the like, into multi-threaded languages capable of executing on specialty processors will be forecasted correctly. For example, a COBOL transaction is typically associated with a linear time complexity, where the running time of a transaction increases linearly with the length of the input. In COBOL, the compiler can redirect some repetitive processes in a parallel manner, such as using a repetitive PERFORM call or multiple processors can be used at once for SORT sequences. However, true parallel programming is not available through a COBOL compilers as most programs are I/O bound and not CPU bound.

Java and other languages, such as C++ and Nexus, behave in an exponential manner as they have the ability to execute processes in a parallel manner for both I/O and computational workloads. A Java engine will parallelize until the hardware limitations are reached. Due to the different execution for processing, I/O, and storage, when transferring workloads from COBOL to Java, the gateway health monitoring system needs to identify a relationship to bridge the transfer from traditional mainframe languages to multi-threaded languages so that forecast values can be generated to accurately identify a proposed infrastructure configuration for the migration, in accordance with one or more embodiments.

According to one or more embodiments, the gateway health monitoring system determines and monitors the health of the hybrid cloud system during the migration from general-purpose processors to specialty processors for workload execution. For example, the gateway health monitoring system can determine what the expected impact is with respect to resource usage in an application chain when a change in usage of the chain is considered (e.g., a change in the number of sales quotes or other entity utilization driver), what the expected impact is with respect to resource usage in an application chain when a modernization change in usage of the chain is considered (e.g., transitioning from COBOL to Java), and what the expected impact is with respect to resource usage in an application chain when a change in target infrastructure is considered (e.g., migration to cloud computing platform, transformation to new technologies such as a data virtualization manager, etc.). Entity utilization drivers are the key activities that drive the operational and output results of an entity such as an organization using the computer systems in the hybrid cloud system. Examples of entity utilization drivers can include but are not limited to salespeople, number of stores, web traffic, number and price of products sold, units of production, and the like, all of which cause data to flow on computer systems, cause data to be stored on the computer systems, cause operations to be executed via processors on the computer systems, cause bandwidth to be allocated on the computer systems, etc.

As further technical solutions and benefits, the gateway health monitoring system leverages the different data associated with the hybrid cloud system and data analysis to improve operationalization of the transactions of clients executed on computer systems. In some embodiments, the gateway health monitoring system is an enhancement to application programming interface (API) tools or products for API-enabled mainframes to improve operationalization efficiency and effectiveness.

The gateway health monitoring system includes different interfaces which connect sources and destinations through various gateways utilizing a brokerage system. External controls of the system are used to manage the different interfaces and routes for end-to-end processing. In some embodiments, the gateway health monitoring system uses time complexity measurements to ensure that the correct timeout values are being allocated for the migration from general-purpose processors to specialty processors.

In some embodiments, the gateway health monitoring system receives or collects data from multiple data sources. Examples of such data sources include system management facilities (SMF) records from different components of the hybrid cloud system, such as IBM® Db2® software, Web-Sphere, customer information control system (CICS), as well as resource measurement facility (RMF) records from a workload management system of the hybrid cloud system. SMF records include information about the configuration, paging activity, workloads and the like of a mainframe that are stored in a file. RMF records include data for long-term performance analysis and capacity planning.

In accordance with one or more embodiments, the gateway health monitoring system applies one or more known machine learning and/or artificial intelligence techniques to the collected data to determine correlations between entity utilization metrics, transaction rates, CPU times, and execution of the various general-purpose processors and specialty processors. This trains the machine learning model based on entity utilization metrics, transaction rates, CPU times, and execution of the various general-purpose processors and specialty processors. The gateway health monitoring system identifies a relationship between the entity utilization metrics and information technology (IT) performance metrics and then validates the identified relationship. IT performance metrics are the different measurements of the different components of the hybrid cloud system and/or mainframe computer. IT performance metrics can measure accuracy, efficiency, and speed of executing workloads or other computer program instructions. Examples of IT performance metrics include, but are not limited to, response time for execution of a task, throughput rate of a component, utilization rate of a component, availability of a component, or the like.

After validating the relationship between the entity utilization metrics and IT performance metrics, the gateway health monitoring system defines forecasted values for the entity utilization drivers using the relationship between the entity utilization metrics and IT performance metrics and translates the forecasted values into IT performance metric levels as a function of time. The forecasted values are predictive values that reflect how the system will behave after the migration of the mainframe to the hybrid cloud system. The forecasted values are generated by analyzing historical data and past patterns. The gateway health monitoring system generates a migration strategy based on the forecasted values. The migration strategy can include one or more proposed infrastructure configurations. The migration strategy can also include an identification of additional hardware or software components needed for the migration of the mainframe to the hybrid cloud system and data identifying the entity utilization drivers, proposed cost savings, and the like.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning now to FIG. 1, a computer system 100 is generally shown in accordance with one or more embodiments of the invention. The computer system 100 can be an electronic computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, a desktop computer, a laptop computer, a tablet computer, or a smartphone. In some examples, the computer system 100 may be a cloud computing node. The computer system 100 may be described in the general context of computer system executable instructions, such as program modules, being executed by a computer system. Generally, program modules may include routines, programs, objects, components, logic, data structures, and so on that perform tasks or implement abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, a multi-core processor, a computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

The software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
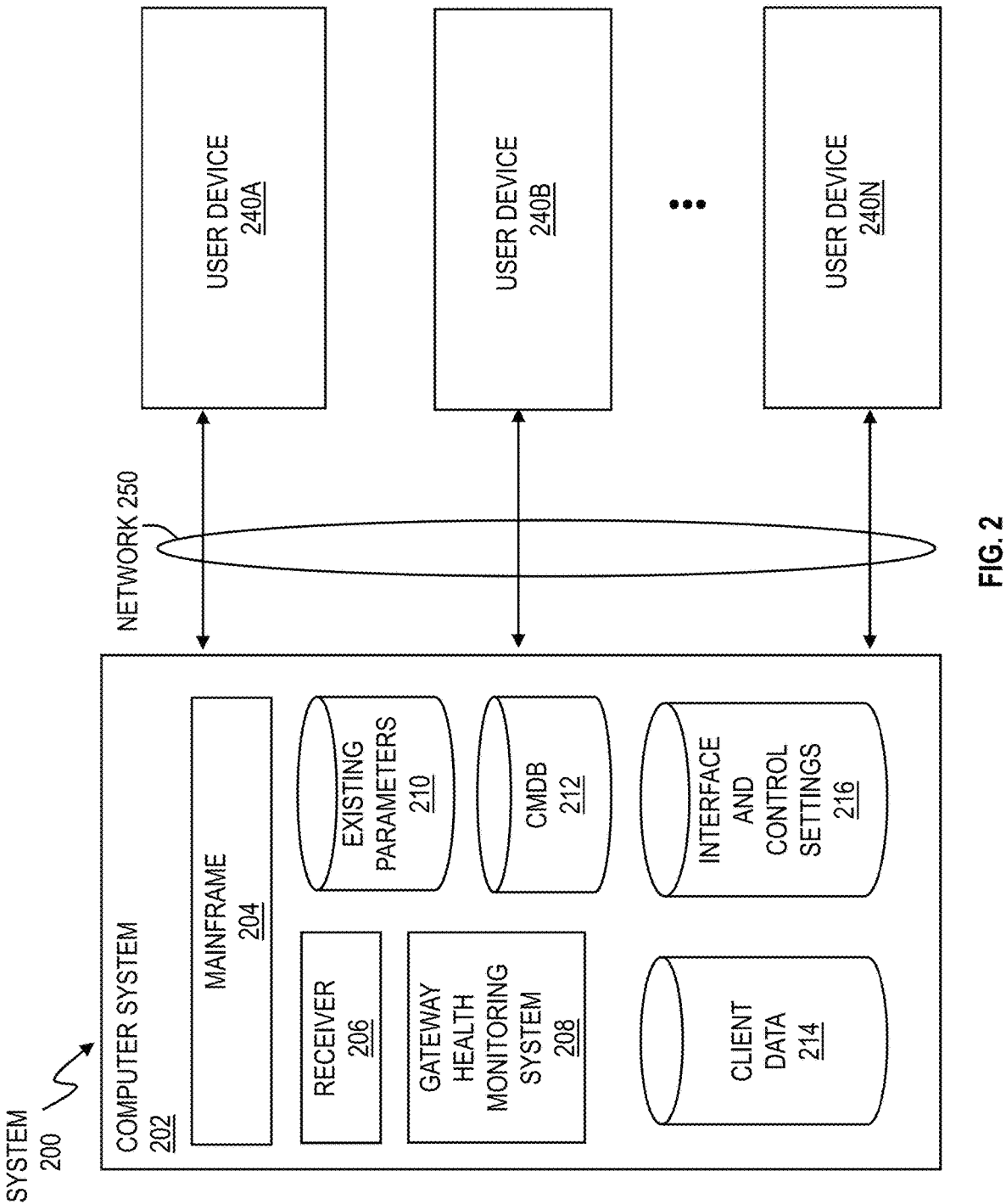
FIG. 2 depicts a block diagram of an example system for a gateway health monitoring system in a computing environment in accordance with one or more embodiments of the present invention.

FIG. 2 depicts a block diagram of an example system 200 for a gateway health monitoring system in a computing environment according to one or more embodiments. The system 200 includes a computer system 202 configured to communicate over a network 250 with many different user devices, such as a user device 240A, a user device 240B, through a user device 240N. The user devices 240A, 240B, through 240N can generally be referred to as user device 240 and are utilized to access the computing environment. The user device 240 can be a personal computer or laptop. The user device 240 can be a mobile device such as a cellular phone or tablet, or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The user devices 240 can include various software and hardware components including software applications (apps) for communicating with one another over the network 250 as understood by one of ordinary skill in the art. The computer system 202, user device(s) 240, a mainframe 204, a receiver 206, a gateway health monitoring system 208, a datastore of existing parameters 210, a configuration management database (CMDB) 212, a datastore of client data 214, a datastore of interface and control settings 216, etc., can include functionality and features of the computer system 100 in FIG. 1, including various hardware components and various software applications, such as the software 111, which can be executed as instructions on one or more processors 101 in order to perform actions according to one or more embodiments of the invention. The mainframe 204, the receiver 206, the gateway health monitoring system 208, the datastore of existing parameters 210, the CMDB 212, the datastore of client data 214, and/or the datastore of interface and control settings 216 can include, be integrated with, and/or call other pieces of software, algorithms, application programming interfaces (APIs), etc., to operate as discussed herein.

The computer system 202 may be representative of numerous computer systems and/or distributed computer systems configured to provide mainframe 204, the receiver 206, the gateway health monitoring system 208, the datastore of existing parameters 210, the CMDB 212, the datastore of client data 214, and/or the datastore of interface and control settings 216, to one or more user devices 240. The computer system 202 can be part of a cloud computing environment such as a cloud computing environment 50 depicted in FIG. 6, as discussed further herein.

In some embodiments, the computer system 202 can include one or more components for the gateway health monitoring system 208. For example, the computer system 202 can include a mainframe 204, a receiver 206, and a gateway health monitoring system 208. In some embodiments, the receiver 206 is a component of the computer system 202 that collects data from different components of the computer system 202, as further discussed herein.

The gateway health monitoring system 208 can include different modules and use information from components of the computer system 202 and/or datastores of the computer system 202, such as existing parameters 210, the CMDB 212, the client data 214, and/or the interface and control settings 216. In some embodiments, the gateway health monitoring system 208 uses information from one or more of the datastores of the computer system 202 (e.g., existing parameters 210, the CMDB 212, client data 214, and/or the interface and control settings 216) to determine correlations between entity utilization drivers of an organization and informational technology (IT) metrics of the mainframe 204, validating the entity utilization drivers, generating forecasted values for the entity utilization drivers, and generating a proposed infrastructure configuration for a migration strategy for the mainframe 204.

In some embodiments, the computer system 202 includes the datastore of existing parameters 210, which stores data associated with the response time of transactions of the mainframe 204. Examples of such data can include, but are not limited to, metrics associated with the network 250, transaction response time metrics associated with different subsystem or external systems that interact with the mainframe 204, and the like.

In some embodiments, the computer system 202 includes the CMDB 212. The CMDB is a database the stores configuration and infrastructure information associated with a computing environment, such as computer system 202. The CMDB 212 organizes and maintains information about the relationships between hardware, software, and networks of the computing environment. In some embodiments, a component of the computer system 202 facilitates systematically scanning the computing environment that includes the network, servers, mainframes, and other devices to compile and maintain a detailed inventory of the hardware and software assets. The CMDB 212 includes relationship mappings that identify connections and dependencies between components of the computing environment. Data compiled and maintained in the CMDB 212 includes information related to component configurations, incidents, changes, and historical data.

In some embodiments, the computer system 202 includes client data 214. The client data 214 can include entity utilization metrics and additional information associated with entity utilization drivers of the client. The client data 214 can include data associated with their computing system, such as hardware and software components, data associated with transaction requests for data from the mainframe 204, and the like.

Figure 3:
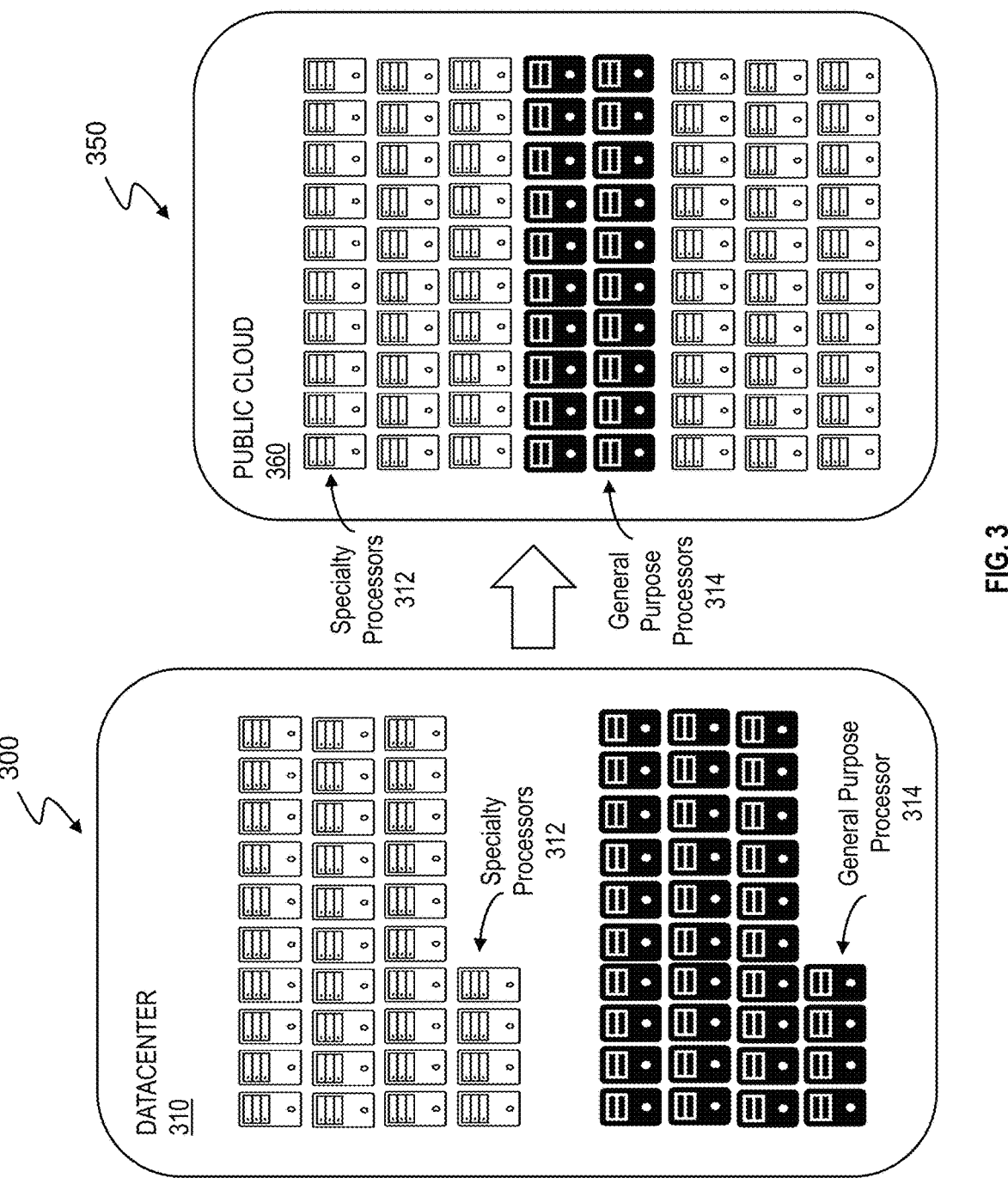
FIG. 3 depicts a block diagram of a digital transformation of a mainframe migration in accordance with one or more embodiments of the present invention.

Now referring to FIG. 3, a block diagram depicts a digital transformation of a mainframe migration in accordance with one or more embodiments of the present invention. A current state 300 of a computing environment is depicted. In the example, the current state 300 shows a datacenter 310 that includes a grouping of specialty processors 312 and a grouping of general-purpose processors 314.

The specialty processors 312 augment the general-purpose processors 314. Instead of running all workloads on the general-purpose processors 314, specific workloads are re-distributed to the specialty processors 312 for execution. Workloads that are redirected to specialty processors 312 are not factored into the charges associated with execution of tasks on the general-purpose processors 314 of a mainframe 204. Significant cost savings are realized if sufficient workloads are redirected to specialty processors 312.

An example of a type of specialty processor 312 is an Integrated Facility for Linux (IFL) processors, which are used for processing Linux or OpenSolaris workloads. Another type of specialty processor 312 is a System z® Integrated Information Processor (zIIP). zIIP is a processor designed to operate asynchronously with general-purpose processors 314 to help improve utilization of computing capacity and control costs. A zIIP can process new workloads, manage containers and hybrid cloud interfaces, facilitate system recovery, and assist with analytics, systems monitoring, and other applications. In some embodiments, general-purpose processors 314 are underclocked or modified to run at a lower clock rate while zIIP are not. Accordingly, as the general-purpose processors 314 are not operating at their full capacity, workloads re-directed to zIIP are processed in less time than if processed by general-purpose processors 314 and result in additional cost-savings.

The future state 350 of the computing environment depicted in FIG. 3 is based on a migration strategy generated by the gateway health monitoring system 208. In one example, the gateway health monitoring system 208 receives a request to generate a migration strategy. The request includes parameters for cost reduction and system optimization for the datacenter 310. The gateway health monitoring system 208 obtains data from multiple sources, such as the datastore of existing parameters 210, the CMDB 212, the datastore of client data 214, and/or the datastore of interface and control settings 216 and generates a migration strategy for the datacenter 310 that includes proposed system configurations (e.g., migration to a hybrid cloud, such as public cloud 360), transformation of workloads from a traditional mainframe language, such as COBOL, into multi-threaded languages, such as Java), and the like. The future state 350 of the computing environment shows a public cloud 360 comprising a combination of specialty processors 312 and general-purpose processors 314. As shown in the future state 350, the public cloud 360 has a larger number of specialty processors 312 than general-purpose processors 314 based on the migration strategy generated for the datacenter 310 using a forecasting methodology of the gateway health monitoring system 208. In response to the acceptance/implementation of the migration strategy generated by the gateway health monitoring system 208, the gateway health monitoring system 208 can interact with one or more migration services, pieces of migration software, IT operators, etc., to cause the migration strategy to be executed, thereby causing the digital transformation of the mainframe migration from the current state 300 to the future state 350 of the computing environment.

Figure 4:
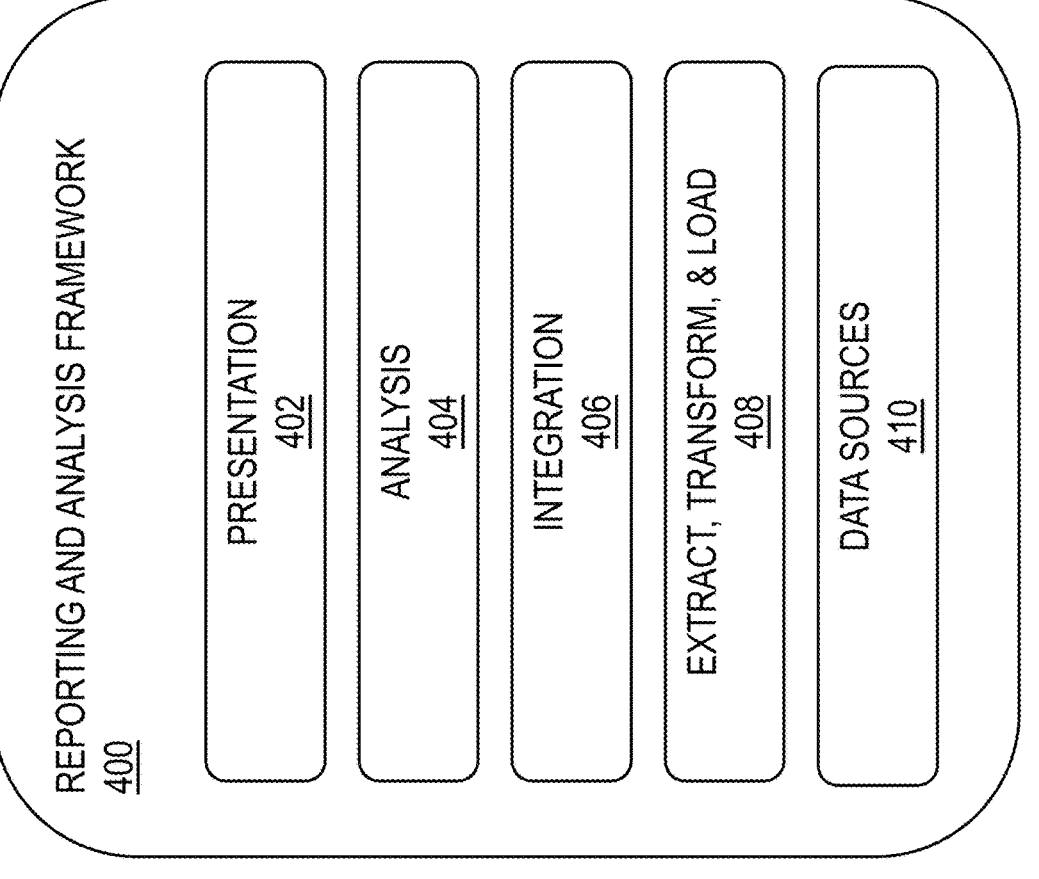
FIG. 4 depicts a block diagram of a reporting and analysis framework for a gateway health monitoring system in a computing environment in accordance with one or more embodiments of the present invention.

FIG. 4 depicts a block diagram of a reporting and analysis framework 400 for a gateway health monitoring system 208 in a computing environment in accordance with one or more embodiments of the present invention. For example, the reporting and analysis framework 400 includes a presentation layer 402, an analysis layer 404, an integration layer 406, an extract, transform, and load (ETL) layer 408, and the data sources layer 410.

The presentation layer 402 enables a user to specify how data should be presented or stored by the gateway health monitoring system 208. For example, a user can select an application or platform to monitor and manage data and resources of a computing environment in real-time. Examples of applications or platforms include, but are not limited to, CloudWatch and Grafana. In some embodiments, a user can specify that data should be stored in a data structure, such as a database or spreadsheet.

The analysis layer 404 encompasses the predictive modeling used by the gateway health monitoring system 208 to generate a migration strategy for an identified mainframe 204. In some embodiments, the gateway health monitoring system 208 uses one or more known techniques for machine learning and/or artificial intelligence to identify correlations between transactions rates, processor times, entity utilization metrics, etc. and using the correlations to generate forecasted values to generate the migration strategy for the mainframe 204. The data used by the analysis layer can be the output of the ETL layer 408. Further, a machine learning model (e.g., such as a neural network) of the gateway health monitoring system 208 can be trained on transactions rates, processor times, entity utilization metrics, etc. to generate forecasted values.

The integration layer 406 of the reporting and analysis framework 400 is directed to the different components of the computing system 202 (e.g., mainframe 204, external systems accessing assets of the mainframe 204, etc.), data associated with their respective capabilities and requirements, and how the different components interact or communicate.

A typical mainframe 204 is a centralized computing environment that includes high-performance computers used for large-scale compute-intensive purposes that require greater availability and security. A hybrid cloud system combines and unifies on-premises (e.g., mainframes 204), public clouds, private clouds, and edge computing to create a single infrastructure.

To integrate a mainframe into a hybrid cloud system, the mainframe 204 can be an API-enabled mainframe that includes an API middleware layer that sits between the client level (e.g., public or private cloud) and the systems of record (e.g., mainframe 204), translating the client level requests into execution within the core systems of record. The API middleware level of a mainframe provides a connectivity bridge between client requests and the systems of record. It also handles any format and mapping requirements between different formats and protocols from the client level or the system of record. In some embodiments, the API middleware layer includes a mainframe-specific layer that handles mainframe-specific resources.

The integration layer 406 encompasses the data associated with the different components of the hybrid cloud system, how the different components can be used or substituted for specific tasks, and the like.

The ETL layer 408 is directed to the process of the gateway health monitoring system 208 for data integration. The gateway health monitoring system 208 extracts data from different sources (e.g., from the data sources layer 410), transforms the data, and loads the transformed data into a database or other target system. The data includes entity utilization data, transaction level data, response time data, and/or hardware utilization data associated with the different systems and components of the hybrid cloud system. The data is used in the analysis of the hybrid cloud infrastructure to forecast values for identified entity utilization drivers to generate a proposed infrastructure configuration for a migration strategy for the mainframe 204.

The data sources layer 410 of the reporting and analysis framework 400 outlines the different types of data to collect, the different sources of the data, and/or collection method of the data. For example, in some embodiments, the gateway health monitoring system 208 collects entity data, such as entity utilization metrics, entity utilization drivers, and the like. The entity data can be provided in a file or other data storage structure or can be accessed from the client, such as via a private cloud operated by the client. In some embodiments, the data can be data obtained from a data monitoring service or platform of the hybrid cloud system or a component of the system. Examples of the monitoring service or platform include CloudWatch, Prometheus, OpenSearch, and the like. In some embodiments, the data is component data obtained from the component of the hybrid cloud system. The component data can include response time throughput, hardware utilization, and other metrics.

Figure 5:
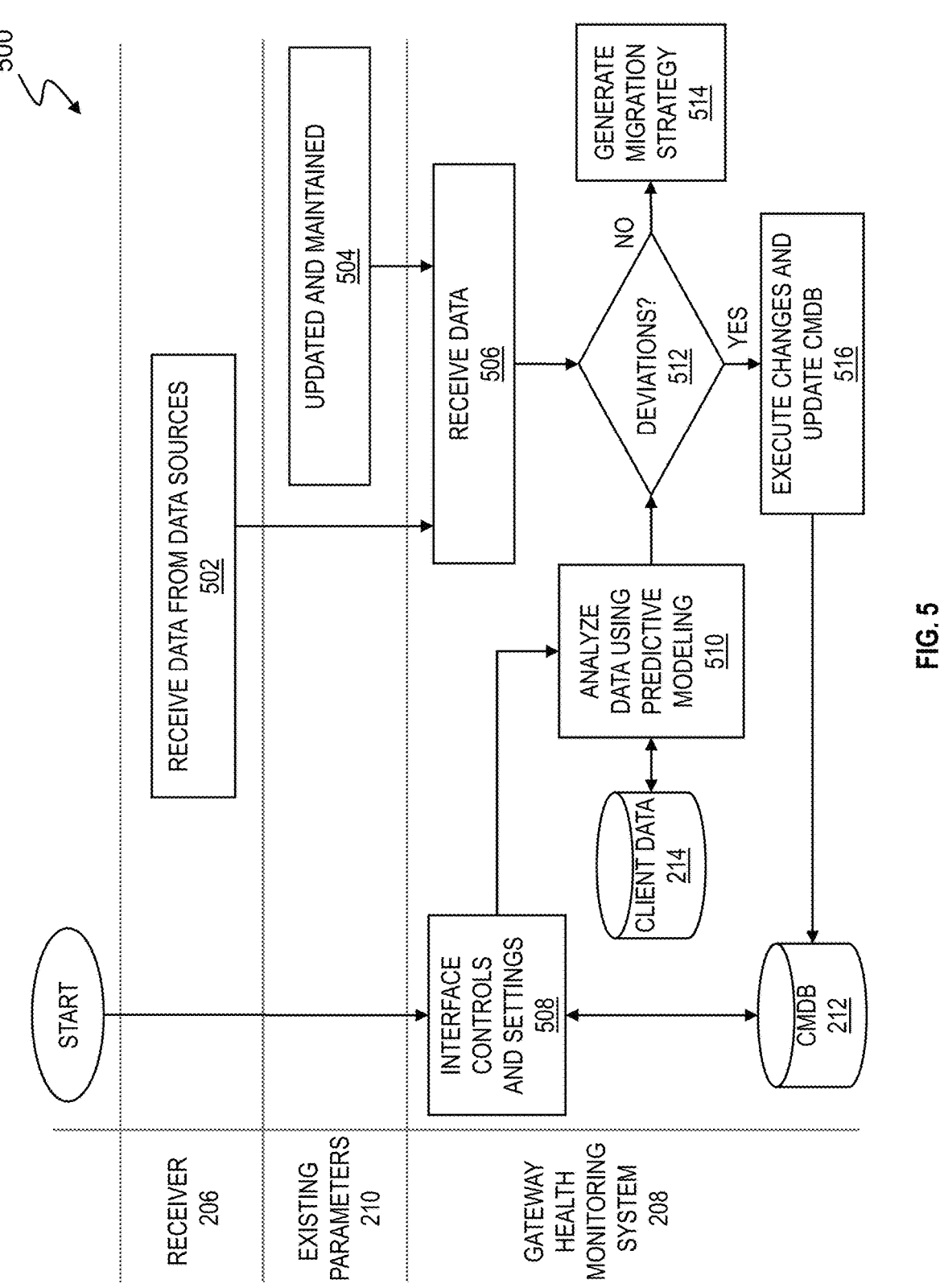
FIG. 5 is a flowchart of a computer-implemented method for a gateway health monitoring system in a computing environment in accordance with one or more embodiments of the present invention.

Now referring to FIG. 5, a flowchart depicts a computer-implemented method 500 for a gateway health monitoring system in a computing environment. At block 502, the receiver 206 collects and/or receives data from data sources. In some embodiments, the receiver 206 collects and/or receives data from data sources in response to receiving a request to generate a migration strategy to integrate the mainframe 204 with a hybrid cloud system. In some embodiments, the request includes a requested cost reduction or performance optimization for the migration strategy.

In some embodiments, the receiver 206 is a component in the API middleware layer of a mainframe 204 that is API-enabled. The receiver 206 collects data from different data sources of the computing environment. For example, entity data can be obtained from a file or other data storage structure or can be accessed from the client, such as through a private cloud operated by the client. The receiver 206 can collect data from a data monitoring service or platform of the computing environment. Data monitoring services or platforms are components that monitor the real-time status of each technology stack component distributed in a computing environment. In some embodiments, the receiver 206 obtains or collects data specified by the gateway health monitoring system 208 from different components of the computing environment.

At block 504, the existing parameters of the computing environment are updated and/or maintained. In some embodiments, the computer system 202 updates and maintains a datastore of existing parameters 210 of the computing environment and data associated with the response time of transactions of the mainframe 204. Existing parameters updated or maintained in the datastore of existing parameters 210 include metrics associated with the network 250, transaction response time metrics associated with different subsystem or external systems that interact with the mainframe 204, and the like.

At block 506, the gateway health monitoring system 208 receives data from the receiver 206 and the existing parameters. In some embodiments, the gateway health monitoring system 208 receives data in response to initiating the generation of a migration strategy for a mainframe 204. In some embodiments, the initiation of the generation of the migration strategy triggers the collection of data. In some embodiments, the collection of data is associated with a request that includes parameters for the data. For example, the request can include a time period for the data (e.g., previous week, month, etc.), types of data to be collected, sources of data from which to collect data, and the like.

At block 508, the gateway health monitoring system 208 manages the interface controls and settings of the computing environment. In some embodiments, the gateway health monitoring system 208 receives data associated with the different interfaces which connect sources and destinations through various gateways. In some embodiments, the relationships between components of the computing environment are retrieved from the CMDB 212.

At block 510, the gateway health monitoring system 208 analyzes data using predictive modeling (e.g., using the trained machine learning model). In some embodiments, the gateway health monitoring system 208 receives one or more metrics or parameters for cost reduction and/or system optimization for the migration of the mainframe 204 to a hybrid cloud system. The gateway health monitoring system 208 receives client data 214 and data from the CMDB 212 for the analysis of data.

The gateway health monitoring system 208 receives an indication or identification of one or more applications of the mainframe 204 for analysis. The gateway health monitoring system 208 identifies entity utilization metrics used in entity planning and operational measurements and maps the entity utilization metrics to the identified applications and associated entity transactions. An example of an entity utilization metric is a sales quote metric. The gateway health monitoring system 208 quantifies the entity utilization metrics and associated information technology (IT) performance metrics over time. For example, the gateway health monitoring system 208 can determine that 10 sales quotes are equivalent to 1 MSU executed on the computer system or 30 bytes of a Direct Access Storage Device (DASD) stored on/by the computer system.

In some embodiments, the gateway health monitoring system 208 evaluates the correlations between the entity utilization drivers and IT performance metrics and identifies correlated sets of entity utilization drivers and metrics. The gateway health monitoring system 208 determines a relationship between the entity utilization drivers and IT performance metrics. For example, a regression curve or a knee of the curve is used to define the relationship between the entity utilization drivers and IT performance metrics.

The gateway health monitoring system 208 validates the relationship between the entity utilization drivers and IT performance metrics. In some embodiments, the gateway health monitoring system 208 uses Big O notation to validate the relationship between the entity utilization drivers and the IT performance metrics. Big O notation is a mathematical notation used to describe the worst-case time complexity or efficiency of an algorithm or the worst-case space complexity of a data structure. Big O notation provides a standardized way to describe the runtime or space requirements of an algorithm scale with the input size.

Common types of Big O used for time and space complexity include constant time ($O(1)$), linear time ($O(n)$), logarithmic time ($O(\log n)$), quadratic time ($O(n^2)$), and cubic time ($O(^3)$). Constant time complexity ($O(1)$) indicates that an algorithm is not dependent on the input size, which means that the run time will always be the same regardless of the input size. Linear time complexity ($O(n)$) indicates that the running time of an algorithm increases linearly with the size of the input. Logarithmic time complexity ($O(\log n)$) indicates that the algorithm reduces the size of the input data in each step. Quadratic time complexity ($O(n^2)$) occurs when the running time of the algorithm increases non-linearly ($n^2$) with the length of the input. Generally, nested loops come under this order where one loop takes $O(n)$ and if the function involves a loop within a loop, then it goes for $O(n)*O(n)=O(n^2)$ order. Cubic time complexity ($O(n^3)$) indicates that the running time of an algorithm is proportional to the cube of the input size. For example, if there are 'm' loops defined in the function, then the order is given by $O(n^m)$, which are called polynomial time complexity functions.

After validating the relationship between the entity utilization metrics and IT performance metrics, the gateway health monitoring system 208 defines forecasted values for the entity utilization drivers using the relationship between the entity utilization metrics and IT performance metrics and translates the forecasted values into IT performance metric levels as a function of time. For example, the gateway health monitoring system 208 can use one or more machine learning/AI techniques to generate the forecasted values. The forecasted values are predictive values indicative of how the system will behave after the migration of the mainframe 204 to the hybrid cloud system.

For example, based on historical trends, the gateway health monitoring system 208 determines that the CPU usage of a server will increase by 20% over the next month. The gateway health monitoring system 208 uses past data collected to determine that for every 10% increase in CPU usage, there is a corresponding 5% increase in response time. Thus, if the current CPU usage of a server is 50%, the gateway health monitoring system 208 generates forecasted values that in one month, the forecasted CPU usage will be 70% because the data indicates that the current usage (50%) will increase by 20% over the next month, resulting in the forecasted value being calculated by adding 50% and 20%, resulting in 70% CPU usage. The corresponding increase in response time is then generated by calculating that the increase in the CPU usage (20%) using the correlation of 10% increase in CPU usage resulting in an increase of 5% response time, which results in a forecasted corresponding increase in response time of 10% (i.e., 20%/10%*5%=10%). Therefore, the gateway health monitoring system 208 determines that if the CPU usage of the server escalated to 70%, the generated forecasted value in the response time corresponding to the increase in CPU usage is approximately an increase of 10% in the next month.

At block 512, the gateway health monitoring system 208 determines if there are any deviations or issues of the forecasted values. In some embodiments, the gateway health monitoring system 208 determines if there are any deviations or issues of the forecasted values by determining the correlation coefficient of the forecasted values. The correlation coefficient is a statistical measure of the strength of a linear relationship between two variables. The gateway health monitoring system 208 determines the correlation coefficient of the forecasted values using any known methods. In some embodiments, the gateway health monitoring system 208 compares the correlation coefficient to a predetermined value. If the correlation coefficient is equal to or greater than the predetermined value, the forecasted values do not have any deviations or issues and the method proceeds to block 514. If the gateway health monitoring system 208 determines that the forecasted values do have deviations or issues (i.e., the correlation coefficient of the forecasted values is less than the predetermined value), the method proceeds to block 516.

At block 514, the gateway health monitoring system 208 generates a migration strategy. In some embodiments, the gateway health monitoring system 208 generates a migration strategy that includes one or more proposed infrastructure configurations based on the forecasted values. As displayed on a display screen to the user in a graphical user interface (GUI) for acceptance (e.g., a displayed button), rejection, and/or modification, the proposed infrastructure configurations can include identification of additional hardware or software components needed for the migration of the mainframe 204 to the hybrid cloud system. For example, the migration strategy can identify additional specialty processors to be added or reduced, additional general-purpose processors to be added or reduced, additional memory to be added or reduced, additional input/output to be added or reduced, etc., based on the forecasted values and availability of the same. In some embodiments, the migration strategy includes data identifying the entity utilization drivers, proposed cost savings, and the like. Accordingly, upon acceptance by the operation via the GUI with any desired modification, the migration strategy is executed by the computer system 202 for the mainframe 204, as depicted in the example of FIG. 3.

At block 516, the gateway health monitoring system 208 executes changes and updates the CMDB 212. In some embodiments, the gateway health monitoring system 208 executes changes and updates the CMDB 212 in response to determining that there are deviations or issues of the forecasted values. In some embodiments, the gateway health monitoring system 208 modifies the forecasted values by executing changes in the analysis, determining new forecasted values, and recalculating the correlation coefficient for the new forecasted values of the entity utilization drivers and IT performance metrics. In some embodiments, the gateway health monitoring system 208 updates the CMDB 212 based on the executed changes.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
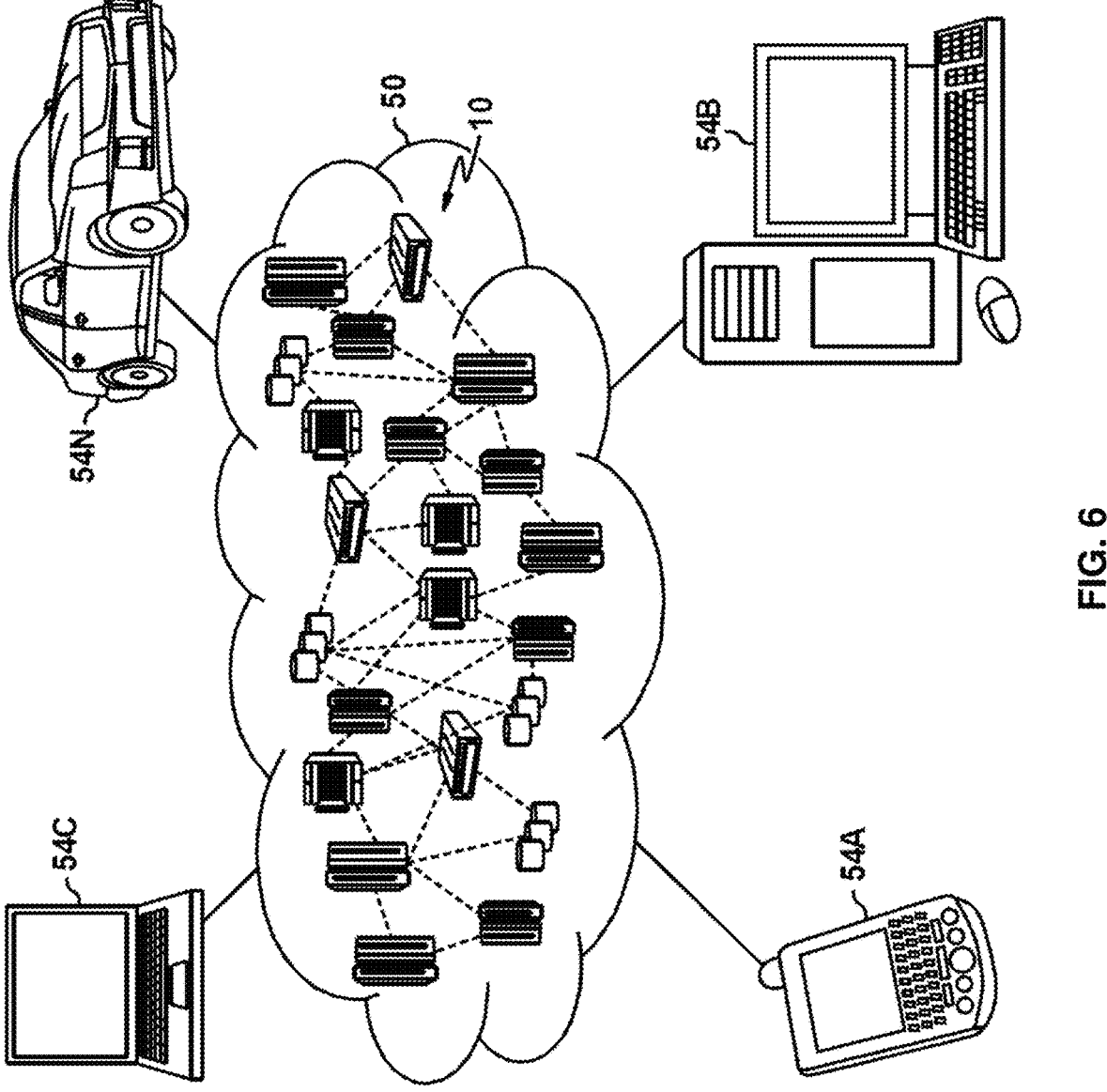
FIG. 6 depicts a cloud computing environment in accordance with one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
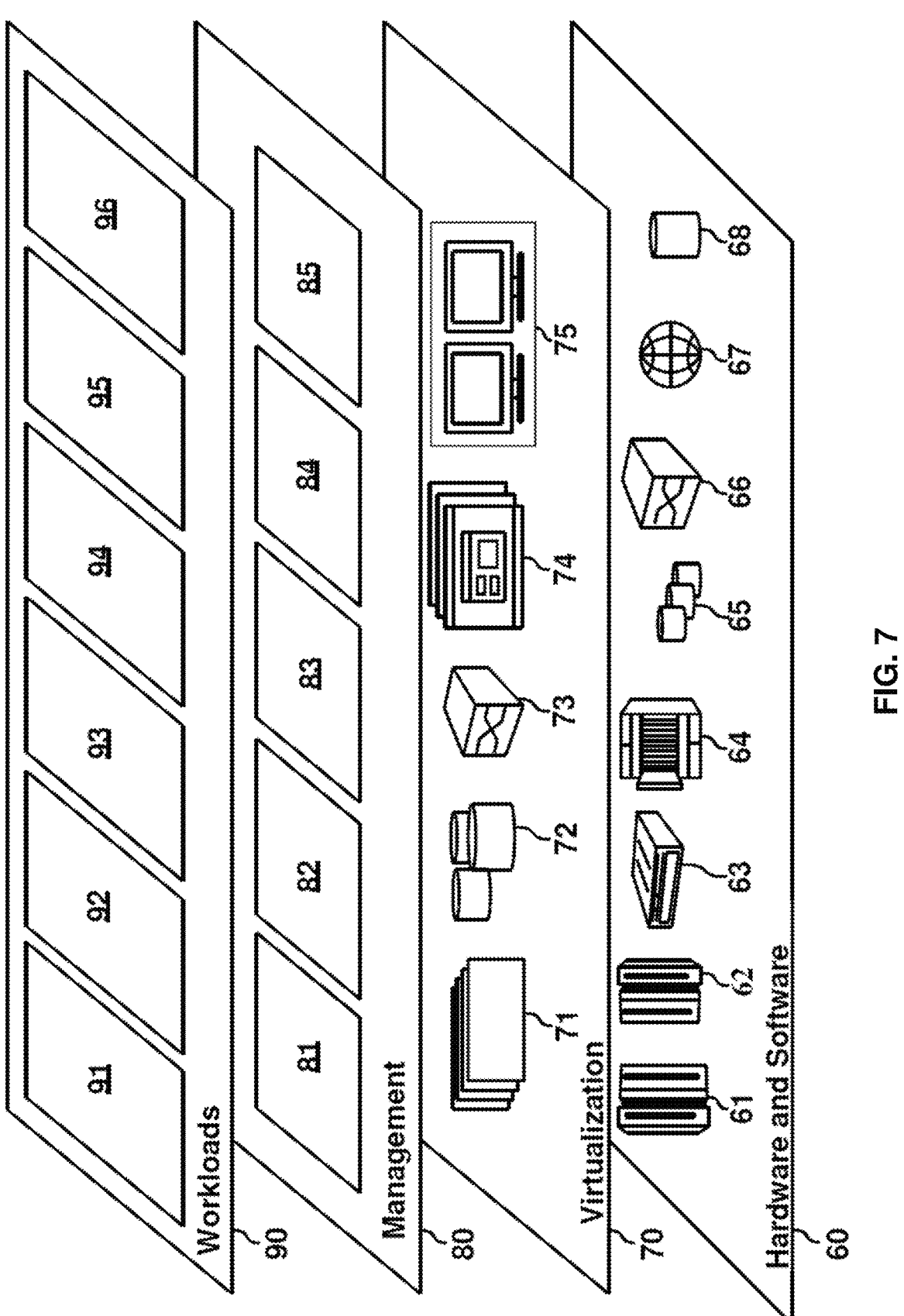
FIG. 7 depicts abstraction model layers in accordance with one or more embodiments of the present invention.

Referring now to FIG. 7, a set of functional abstraction layers provided by cloud computing environment 50 (depicted in FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for the purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   generating a mapping between entity utilization metrics and an application of a mainframe of a hybrid cloud system;
   determining a correlation between the entity utilization metrics and information technology (IT) performance metrics;
   defining a relationship between an entity utilization driver and the IT performance metrics using the mapping and the correlation, wherein the entity utilization driver comprises at least one of a number of products, a price of the products, personnel, or a number of stores, wherein a machine learning model is trained based on the entity utilization metrics, transaction rates, and central processing unit (CPU) times, wherein the relationship is validated;
   generating, by the machine learning model, forecasted values using the relationship between the entity utilization driver and the IT performance metrics; and
   generating a proposed infrastructure configuration based on the forecasted values, wherein the forecasted values are predictive values reflecting how the application behaves when migrated from the mainframe to the hybrid cloud system.

2. The computer-implemented method of claim 1, further comprising:
   validating the relationship between the entity utilization driver and the IT performance metrics using values calculated using big O functions.

3. The computer-implemented method of claim 1, wherein defining the relationship between the entity utilization driver and the IT performance metrics using the mapping and the correlation further comprises:
   using a regression curve to define the relationship between the entity utilization driver comprising the at least one of the number of the products, the price of the products, the personnel, or the number of the stores and the IT performance metrics.

4. The computer-implemented method of claim 1, further comprising:
   receiving the IT performance metrics from different components of the hybrid cloud system.

5. The computer-implemented method of claim 1, further comprising:
   identifying deviations of the forecasted values using a calculated correlation coefficient and a predetermined value.

6. The computer-implemented method of claim 1, further comprising:
   receiving the entity utilization metrics from a file or access to a datastore of an entity.

7. The computer-implemented method of claim 1, further comprising:
   generating a report comprising the proposed infrastructure configuration and a list of additional hardware components, a list of additional software components, or proposed cost savings.

8. A system comprising:
   a memory having computer readable instructions; and
   one or more processors for executing the computer readable instructions, the computer readable instructions controlling the one or more processors to perform operations comprising:
      generating a mapping between entity utilization metrics and an application of a mainframe of a hybrid cloud system;
      determining a correlation between the entity utilization metrics and information technology (IT) performance metrics;
      defining a relationship between an entity utilization driver and the IT performance metrics using the mapping and the correlation, wherein the entity utilization driver comprises at least one of a number of products, a price of the products, personnel, or a number of stores, wherein a machine learning model is trained based on the entity utilization metrics, transaction rates, and central processing unit (CPU) times, wherein the relationship is validated;

generating, by the machine learning model, forecasted values using the relationship between the entity utilization driver and the IT performance metrics; and generating a proposed infrastructure configuration based on the forecasted values, wherein the forecasted values are predictive values reflecting how the application behaves when migrated from the mainframe to the hybrid cloud system.

9. The system of claim 8, wherein the one or more processors perform the operations further comprising:

validating the relationship between the entity utilization driver and the IT performance metrics using values calculated using big O functions.

10. The system of claim 8, wherein to define the relationship between the entity utilization driver and the IT performance metrics using the mapping and the correlation, the operations further comprise:

using a regression curve to define the relationship between the entity utilization driver and the IT performance metrics.

11. The system of claim 8, wherein the one or more processors perform the operations further comprising:

receiving the IT performance metrics from different components of the hybrid cloud system.

12. The system of claim 8, wherein the one or more processors perform the operations further comprising:

identifying deviations of the forecasted values using a calculated correlation coefficient and a predetermined value.

13. The system of claim 8, wherein the one or more processors perform the operations further comprising:

receiving the entity utilization metrics from a file or access to a datastore of an entity.

14. The system of claim 8, wherein the one or more processors perform the operations further comprising:

generating a report comprising the proposed infrastructure configuration and a list of additional hardware components, a list of additional software components, or proposed cost savings.

15. A computer program product comprising a computer readable storage medium having program instructions embodied therewith, the program instructions executable by one or more processors to cause the one or more processors to perform operations comprising:

generating a mapping between entity utilization metrics and an application of a mainframe of a hybrid cloud system;

determining a correlation between the entity utilization metrics and information technology (IT) performance metrics;

defining a relationship between an entity utilization driver and the IT performance metrics using the mapping and the correlation, wherein the entity utilization driver comprises at least one of a number of products, a price of the products, personnel, or a number of stores, wherein a machine learning model is trained based on the entity utilization metrics, transaction rates, and central processing unit (CPU) times, wherein the relationship is validated;

generating, by the machine learning model, forecasted values using the relationship between the entity utilization driver and the IT performance metrics; and generating a proposed infrastructure configuration based on the forecasted values, wherein the forecasted values are predictive values reflecting how the application behaves when migrated from the mainframe to the hybrid cloud system.

16. The computer program product of claim 15, wherein the operations further comprise:

validating the relationship between the entity utilization driver and the IT performance metrics using values calculated using big O functions.

17. The computer program product of claim 15, wherein to define the relationship between the entity utilization driver and the IT performance metrics using the mapping and the correlation, the operations further comprise:

using a regression curve to define the relationship between the entity utilization driver and the IT performance metrics.

18. The computer program product of claim 15, wherein the operations further comprise:

receiving the IT performance metrics from different components of the hybrid cloud system.

19. The computer program product of claim 15, wherein the operations further comprise:

identifying deviations of the forecasted values using a calculated correlation coefficient and a predetermined value.

20. The computer program product of claim 15, wherein the operations further comprise:

receiving the entity utilization metrics from a file or access to a datastore of an entity.

21. The computer program product of claim 15, wherein the operations further comprise:

generating a report comprising the proposed infrastructure configuration and a list of additional hardware components, a list of additional software components, or proposed cost savings.

22. A computer-implemented method comprising:

receiving a request for a migration strategy for integration of a mainframe computer to a hybrid cloud system;

receiving performance metrics from different components of the hybrid cloud system;

receiving entity utilization metrics for an organization;

generating forecasted values using the performance metrics and the entity utilization metrics which comprises: generating a mapping between the entity utilization metrics and an application of the mainframe computer, determining a correlation between the entity utilization metrics and the performance metrics, defining a relationship between an entity utilization driver and the performance metrics using the mapping and the correlation, and generating by a machine learning model the forecasted values using the relationship between the entity utilization driver and the performance metrics, wherein the entity utilization driver comprises at least one of a number of products, a price of the products, personnel, or a number of stores, wherein the machine learning model is trained based on the entity utilization metrics, transaction rates, and central processing unit (CPU) times, wherein the relationship is validated; and generating a proposed infrastructure configuration based on the forecasted values, wherein the forecasted values are predictive values reflecting how the application behaves when migrated from the mainframe to the hybrid cloud system.

23. A system comprising:

a memory having computer readable instructions; and one or more processors for executing the computer readable instructions, the computer readable instructions controlling the one or more processors to perform operations comprising:

receiving a request for a migration strategy for integration of a mainframe computer to a hybrid cloud system;

receiving performance metrics from different components of the hybrid cloud system;

receiving entity utilization metrics for an organization;

generating forecasted values using the performance metrics and the entity utilization metrics which comprises: generating a mapping between the entity utilization metrics and an application of the mainframe computer, determining a correlation between the entity utilization metrics and the performance metrics, defining a relationship between an entity utilization driver and the performance metrics using the mapping and the correlation, and generating by a machine learning model the forecasted values using the relationship between the entity utilization driver and the performance metrics, wherein the entity utilization driver comprises at least one of a number of products, a price of the products, personnel, or a number of stores, wherein the machine learning model is trained based on the entity utilization metrics, transaction rates, and central processing unit (CPU) times, wherein the relationship is validated; and generating a proposed infrastructure configuration based on the forecasted values, wherein the forecasted values are predictive values reflecting how the application behaves when migrated from the mainframe to the hybrid cloud system.

* * * * *